US012566911B2

(12) United States Patent (10) Patent No.: US 12,566,911 B2
Jaiswal et al. (45) Date of Patent: Mar. 3, 2026

(54) MACHINE LEARNING TOOL FOR LAYOUT DESIGN OF PRINTED CIRCUIT BOARD

(71) Applicant: Honeywell International Inc., Charlotte, NC (US)

(72) Inventors: Apurv Jaiswal, Bengaluru (IN); Pradeep Apparambath, Bangalore (IN); Shana Afreen, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 658 days.

(21) Appl. No.: 18/059,138

(22) Filed: Nov. 28, 2022

(65) Prior Publication Data

US 2024/0111937 A1 Apr. 4, 2024

(30) Foreign Application Priority Data

Sep. 30, 2022 (IN) .............................. 202211056301

(51) Int. Cl.
*G06F 30/398* (2020.01)
*G06N 3/08* (2023.01)
*G06F 115/12* (2020.01)
(52) U.S. Cl.
CPC ............. *G06F 30/398* (2020.01); *G06N 3/08* (2013.01); *G06F 2115/12* (2020.01)
(58) Field of Classification Search
CPC .... G06F 30/398; G06F 2115/12; G06F 30/27; G06F 30/367; G06N 3/08; G06N 3/09; G06N 3/091; G06N 3/092
USPC ........................................................ 716/137
See application file for complete search history.

(56) References Cited

U.S. PATENT DOCUMENTS

| | | | |
|---|---|---|---|
| 10,515,172 B2 | 12/2019 | Wu et al. | |
| 10,796,046 B2 | 10/2020 | Kourkoulos et al. | |
| 11,275,883 B2 | 3/2022 | Kourkoulos et al. | |
| 2021/0014979 A1* | 1/2021 | Adler ................... | G06F 18/214 |
| 2021/0158127 A1 | 5/2021 | Ren et al. | |
| 2021/0398439 A1* | 12/2021 | Li ........................... | G09B 7/02 |
| 2022/0004900 A1* | 1/2022 | Salahuddin .............. | G06N 3/08 |
| 2023/0101250 A1* | 3/2023 | Kosman ................. | G06V 10/82 |
| | | | 382/156 |
| 2023/0189317 A1* | 6/2023 | Narasimha Swamy ..................... | |
| | | | G06N 3/044 |
| | | | 370/329 |

FOREIGN PATENT DOCUMENTS

| | | |
|---|---|---|
| IN | 202141016526 A | 4/2021 |
| WO | 2017113393 A1 | 7/2017 |

OTHER PUBLICATIONS

Afacan et al., "Review: Machine learning techniques in analog/RF integrated circuit design, synthesis, layout, and test," Integration, vol. 77, Nov. 19, 2020, pp. 113-130.

(Continued)

*Primary Examiner* — Paul Dinh
(74) *Attorney, Agent, or Firm* — Shumaker & Sieffert, P.A.

(57) ABSTRACT

This disclosure is directed to a system and method for applying machine learning model to a PCB layout to obtain an estimate of the parasitic values of the board. The machine learning model may be trained with various PCB layouts to accurately determine an estimated parasitic impedance. Determine regions of the board having a high parasitic impedance value, alerting the user to reconfiguring the region so to achieve a desired range of values.

19 Claims, 6 Drawing Sheets

(56)　　　　　　　References Cited

OTHER PUBLICATIONS

Extended Search Report from counterpart European Application No. 23196603.7 dated Feb. 14, 2024, 12 pp.

Pradipta et al., "A Machine Learning Based Parasitic Extraction Tool," University of Minnesota, Jan. 19, 2020, pp. 1-3.

Sen et al., "Neural-Network-Based Parasitic Modeling and Extraction Verification for RF/Millimeter-Wave Integrated Circuit Design," IEEE Transactions on Microwave Theory and Techniques, vol. 54, No. 6, Jun. 2006, pp. 2604-2614.

Shook et al., "LParest: Machine Learning based Parasitic Estimation for Custom Circuit Design", 2020 57th ACM/IEEE Design Automation Conference (DAC), IEEE, Jul. 20, 2020, 6 pp.

Yu et al., "Advancements and Challenges on Parasitic Extraction for Advanced Process Technologies", 2021 26th Asia and South Pacific Design Automation Conference (ASP-DAC), IEEE, Jan. 18, 2021, pp. 841-846.

Response to Extended Search Report dated Feb. 14, 2024, from counterpart European Application No. 23196603.7 filed Jun. 20, 2024, 15 pp.

\* cited by examiner

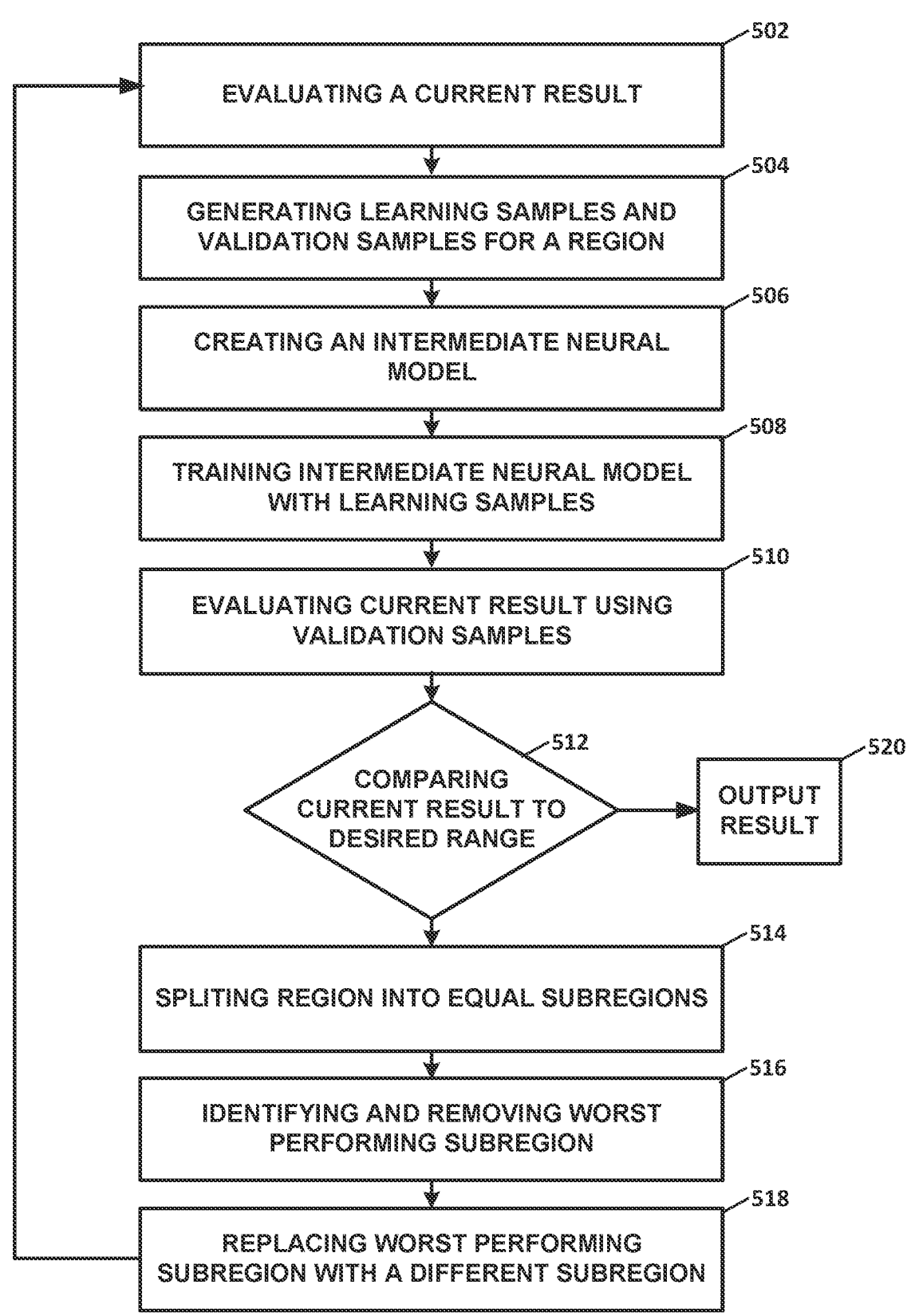

502
EVALUATING A CURRENT RESULT

504
GENERATING LEARNING SAMPLES AND VALIDATION SAMPLES FOR A REGION

506
CREATING AN INTERMEDIATE NEURAL MODEL

508
TRAINING INTERMEDIATE NEURAL MODEL WITH LEARNING SAMPLES

510
EVALUATING CURRENT RESULT USING VALIDATION SAMPLES

512
COMPARING CURRENT RESULT TO DESIRED RANGE

520
OUTPUT RESULT

514
SPLITING REGION INTO EQUAL SUBREGIONS

516
IDENTIFYING AND REMOVING WORST PERFORMING SUBREGION

518
REPLACING WORST PERFORMING SUBREGION WITH A DIFFERENT SUBREGION

OBTAIN PRINTED CIRCUIT BOARD LAYOUT

604

APPLY MACHINE LEARNING MODEL TO
PRINTED CIRCUIT BOARD LAYOUT

606

DETERMINE AN ESTIMATE OF THE
PARASITIC IMPEDANCES FOR AN ELEMENT
OF THE PRINTED CIRCUIT BOARD LAYOUT

608

OUTPUT THE ESTIMATE OF THE PARASITIC
IMPEDANCE FOR THE ELEMENT OF THE
PRINTED CIRCUIT BOARD LAYOUT

1

MACHINE LEARNING TOOL FOR LAYOUT DESIGN OF PRINTED CIRCUIT BOARD

This application claims the benefit of Indian Provisional Patent Application No. 202211056301, filed on Sep. 30, 2022, the entire contents of which is incorporated herein by reference.

TECHNICAL FIELD

The disclosure relates to printed circuit board layout tools.

BACKGROUND

Circuit board simulation tools are helpful in lowering the cost and time needed for board manufacturing, while improving the accuracy of board design performance.

SUMMARY

In accordance with techniques of the disclosure, a printed circuit board (PCB) layout tool is set forth herein that explains and visualizes an output of a machine learning system that simulates parasitic effects of PCBs. This disclosure is directed to techniques for designing PCB layout tools for predicting the performance of PCB designs, prior to manufacturing the PCBs. Because manufacturing PCBs may require a lot of resources, time, equipment, and money, iterative designs may be simulated with PCB layout tools, to limit the number of manufacturing revisions.

Current circuit board layout tools may not predict the performance of a circuit board with significant accuracy in certain cases. The inaccuracy in predicted performance may be due to parasitic impedances not accurately estimated using current circuit board layout tools. By using machine learning and neural networks, circuit board layout tools of this disclosure may more accurately predict the performance of a circuit board. Error resulting from a difference between simulation and measurement may be reduced using graphical neural network (GNN) predications, as compared with intuition-based predictions, performed by design engineers. The effects of parasitic impedances may be more accurately predicted using machine learning in circuit board layout tools. In this way, a trained neural network may be used to analyze a PCB layout, and more accurately predict the parasitic impedances of a new PCB design. More accurate predictions of parasitic impedances, will allow user to more accurately predict the performance of their PCB design prior to manufacturing it.

In one example, this disclosure describes a method including obtaining a PCB layout. The method also includes applying a machine learning model to the PCB layout to determine an estimate of a parasitic value for an element in the PCB layout. The machine learning model is a trained machine learning model configured to operate on a plurality of PCB layouts. The method also includes outputting the estimate of the parasitic value for the element in the PCB layout.

In another example, a system includes a memory and processing circuitry coupled to the memory. The processing circuitry is configured to obtain a PCB layout and apply a machine learning model to the PCB layout to determine an estimate of a parasitic value for an element in the PCB layout. The machine learning model is a trained machine learning model configured to operate on a plurality of PCB layouts. The system also includes a display configured to output the estimate of the parasitic value for the element in the PCB layout.

The details of one or more examples are set forth in the accompanying drawings and the description below. Other features, objects, and advantages will be apparent from the description, drawings, and claims.

BRIEF DESCRIPTION OF DRAWINGS

FIG. 5 is a flow diagram illustrating an example of a process implemented by machine learning model producing an estimate of parasitic impedance, in accordance with one or more techniques of this disclosure.

DETAILED DESCRIPTION

Figure 1:
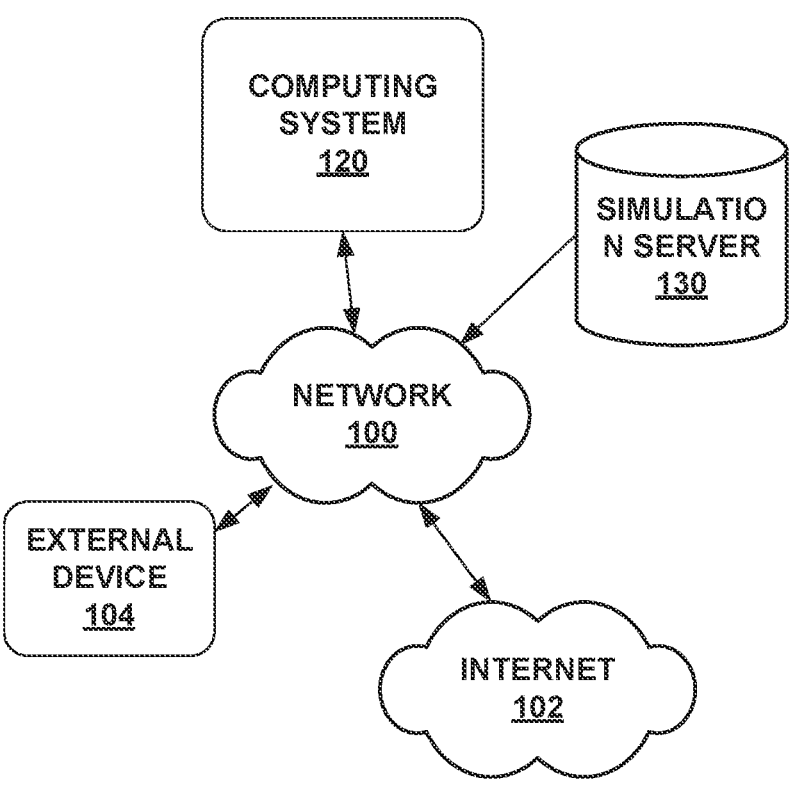
FIG. 1 is a conceptual block diagram illustrating a network of computing systems used for determining parasitic effects of a printed circuit board (PCB) layouts.

Electronic circuits are present in many devices are frequently implemented on printed circuit boards (PCBs). The design and layout of these circuits are facilitated by the use of computer simulation and design iteration. Some PCB layout designs may utilize high frequency, or high speed, signals. However, designing PCB layouts can be a challenging task because the high-speed board parasitic effects, such as parasitic capacitances, resistances, and inductances, have a significant impact on circuit performance. Parasitic effects such as capacitance, resistance, and inductance may also be represented as parasitic impedances. Parasitic impedances may be represented as a complex impedance value. A complex impedance value may include a resistive component value and a reactive component value. The resistive component value of the complex impedance may be a parasitic resistance. The reactive component value of the complex impedance may be a parasitic capacitance (e.g. if value is less than zero) and/or a parasitic inductance (e.g. if value is greater than zero).

High frequency, or high speed, signals may be analog or digital electromagnetic signals used in a variety of ways. In particular, high frequency electromagnetic signals may be used for digital communication, digital clocking, radio frequency (RF) communication, digital data, and other uses pertaining to electromagnetic signal transmission. At high frequencies, electromatic signals become more susceptible to physical topologies of closely positioned electromagnetic materials. Electromagnetic material may be material with conductivity, permittivity, or permeability values significantly different from air. Some applications that play an important role in high frequency circuit design include PCB layouts. PCBs layouts include a dielectric material used to hold conductive traces arranged in particular configurations to manipulate electromagnetic fields in a desired way. The arrangement and layout of the configurations play an important role in the integrity of the high frequency signals. In some examples, electromagnetic traces are arranged on a PCB layout to minimize the electromagnetic losses incurred from parasitic effects. In other examples, evaluation of parasitic effects help instruct how a PCB layout will be configured so as to minimize adverse design criteria (e.g. phase delay, voltage standing waves (VSW)).

Parasitic effects may be generated from variation in the trace and components sizes on a PCB. Parasitic effects may occur when PCB transmission lines vary in width or size from an ideal transmission line topology. At high electromagnetic frequencies, parasitic effects may increase the likelihood of electromagnetic reflections, and thereby increase electromagnetic losses.

Design and layout of PCB layouts may include steps to limit the parasitic effects, thereby improving the efficiency and effectiveness of a PCB layout. One step to limit parasitic effects is to include simulating the electromagnetic effects of a particular circuit design or PCB layout. PCB layout tools may be used to simulate predicted parasitic impedances based on mathematical equations. Equations such as maxwells equations, may be used to solve electric and magnetic fields of a PCB layout. By having an accurate estimate of the parasitic impedances of a circuit or a layout, the parasitic effects may be determined. Based on the parasitic effects, a designer may adjust the PCB layout to compensate for those impedances.

However, PCB layout tools may, in some circumstances, inaccurately predict the parasitic impedances. Due to the inaccuracies, performance estimated using simulations before layout as compared to the performance estimated using simulations after layout, differ. The relation between layout and performance is complex. Traditionally, circuit designers estimate Parasitic impedances according to their experience, leading to longer cycle time.

By using machine learning and neural networks, circuit layout tools may more accurately predict the performance of a circuit board. Therefore, using artificial intelligence (AI) or machine learning (ML) to create design rule checks (DRCs) using previous designs, propagates best practices from the previous designs into new designs.

FIG. 1 is a conceptual block diagram illustrating network 100 of computing systems used for running an electromagnetic simulation. Network 100 in an interconnection of computers, servers, processors, network switches, and other network devices. Network 100 may include connections to the internet 102. The internet 102 may include connections to additional networks of computing systems. Network 100 may include connects to a computing system 120 and to a simulation server 130.

Network 100 may include one or more computing devices, such as one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Network 100 may include one or more networks administered by service providers, and may thus form part of a large-scale public network infrastructure, e.g., the Internet. Network 100 may provide computing devices, such as computing system 120, access to internet 102, and may provide a communication framework that allows the computing devices to communicate with one another. In some examples, network 100 may be a private network that provides a communication framework that allows computing system 120, external device 104, and the simulation server to communicate with one another. While intercommunication among the parts of the network are possible, network 100 may isolate one or more of computing system 120, external device 104, and the simulation server from devices external to network 100 for security purposes.

In some examples, computing system 120 includes at least one of a handheld computing device, computer workstation, server or other networked computing device, smartphone, tablet, or external programmer that includes a user interface for presenting information to and receiving input from a user. The machine learning model may, for example, include a neural network, a deep learning system, or other type of predictive analytics system. A user, such as a circuit design engineer, layout technician, layout specialist, or PCB engineer, may interact with computing system 120 to retrieve electromagnetic simulation data related to estimates of parasitic effects within a PCB design. A user may also interact with computing system 120 to train and verify the machine learning model. Computing system 120 may include a processor configured to run the machine learning model to evaluate a circuit board design. Computing system 120 may run the machine learning model to estimate the parasitic impedances produced by a particular PCB design. In some examples, computing system 120 may be used to produce models for the simulation server. A user on computing system 120 may produce a model of the circuit or PCB and transfer the model to the simulation server via network 100.

The simulation server may include one or more of a file server, an application server, a web server, a database server, a virtual server, a proxy server, a license server, or other computer processor used in processing software remotely from a user input device. The simulation server may be configured to receive simulation models, input parameters or other data for configuring an electromagnetic solver simulation. The server may be further configured to store the machine learning model. The server may receive simulation requests via Network 100, creating a que from which to perform sequential simulation tasks. The simulation server may be configured as a computing system including storage devices for storing an application to train, verify and evaluate a machine learning model.

Figure 2:
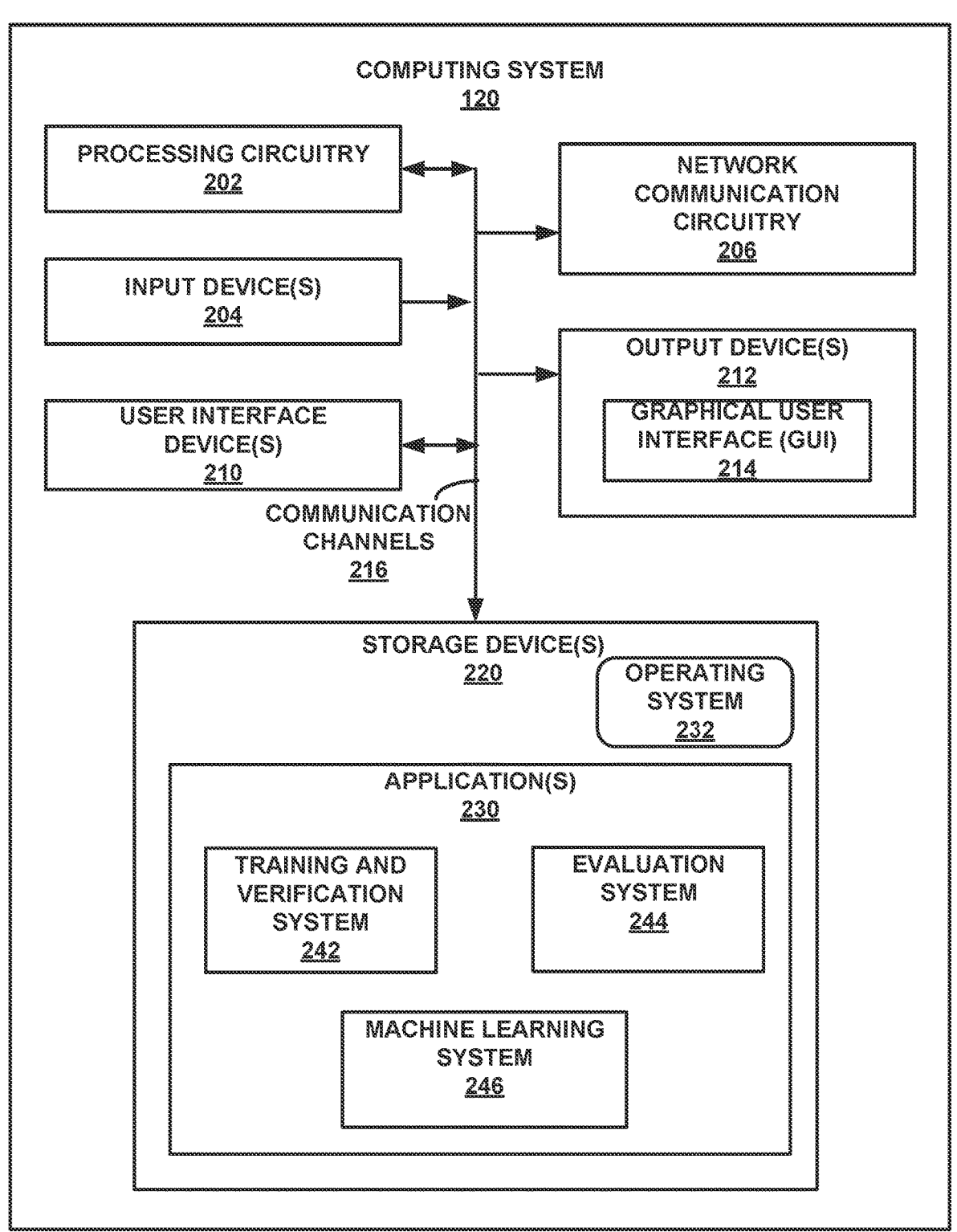
FIG. 2 is a conceptual block diagram illustrating a computing system configured to run a machine learning model for analyzing PCB layouts, in accordance with one or more techniques of this disclosure.

FIG. 2 is a conceptual block diagram illustrating an example of a computing system configured to run machine learning model, according to one or more techniques of this disclosure. In one example, computing system 120 includes processing circuitry 202 for executing applications 230 that include machine learning system 246 or any other applications described herein. Although shown in FIG. 2 as a stand-alone computing system 120 for purposes of example, computing system 120 may be any component or system that includes processing circuitry or other suitable computing environment for executing software instructions and, for example, need not necessarily include one or more elements shown in FIG. 2 (e.g., input devices 204, network communication circuitry 206, user interface devices 210, or output devices 212; and in some examples components such as storage device(s) 220 may not be co-located or in the same chassis as other components). In some examples, computing system 120 may be a cloud computing system distributed across a plurality of devices.

As shown in the example of FIG. 2, computing system 120 includes processing circuitry 202, one or more input devices 204, network communication circuitry 206, one or more storage devices 220, user interface (UI) device(s) 210, and one or more output devices 212. Computing system 120, in one example, further includes one or more application(s) 230 such as machine learning system 246, and operating system 232 that are executable by computing system 120. Each of components 202, 204, 206, 208, 210, and 212 are coupled (physically, communicatively, and/or operatively) for inter-component communications. In some examples, communication channels 216 may include transmission lines, cables, data lines, coaxial connections, fiber optic connections, wireless connections, or any other method for digitally interconnecting components of computing system 120. As one example, components 202, 204, 206, 208, 210, and 212 may be coupled by one or more communication channels 216.

Processing circuitry 202, in one example, is configured to implement functionality and/or process instructions for execution within computing system 120. For example, processing circuitry 202 may be capable of processing instructions stored in storage device 220. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 220 may be configured to store information within computing system 120 during operation. Storage device 220, in some examples, is described as a computer-readable storage medium. In some examples, storage device 220 is a temporary memory, meaning that a primary purpose of storage device 220 is not long-term storage. Storage device 220, in some examples, is described as a volatile memory, meaning that storage device 220 does not maintain stored contents when the computer is turned off. Examples of volatile memories include random access memories (RAM), dynamic random access memories (DRAM), static random access memories (SRAM), and other forms of volatile memories known in the art. In some examples, storage device 220 is used to store program instructions for execution by processing circuitry 202. Storage device 220, in one example, is used by software or applications 230 running on computing system 120 to temporarily store information during program execution.

Storage devices 220, in some examples, also include one or more computer-readable storage media. Storage devices 220 may be configured to store larger amounts of information than volatile memory. Storage devices 220 may further be configured for long-term storage of information. In some examples, storage devices 220 include non-volatile storage elements. Examples of such non-volatile storage elements include magnetic hard discs, optical discs, floppy discs, flash memories, or forms of electrically programmable memories (EPROM) or electrically erasable and programmable (EE-PROM) memories.

Computing system 120, in some examples, also includes network communication circuitry 206. Computing system 120, in one example, utilizes network communication circuitry 206 to communicate with external devices, such as the example of external device 104 of FIG. 1. Network communication circuitry 206 may include a network interface card, such as an Ethernet card, an optical transceiver, a radio frequency transceiver, or any other type of device that can send and receive information. Other examples of such network interfaces may include 3G, 4G, 5G, and WiFi radios.

Computing system 120, in one example, also includes one or more user interface devices 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. A presence-sensitive display may have functionality that is both found in input devices 204 and graphical user interface (GUI) 214.

One or more output devices 212 may include GUI 214. Output device 212, in some examples, is configured to provide output to a user using tactile, audio, or video stimuli. Output device 212, in one example, includes a GUI 214. GUI 214 may be displayed on a monitor including a presence-sensitive display, a sound card, a video graphics adapter card, or any other type of device for converting a signal into an appropriate form understandable to humans or machines. Additional examples of output devices 212 include a speaker, a cathode ray tube (CRT) monitor, a liquid crystal display (LCD), or any other type of device that can generate intelligible output to a user.

Computing system 120 may include operating system 232. Operating system 232, in some examples, controls the operation of components of computing system 120. For example, operating system 232, in one example, facilitates the communication of one or more applications 230 and machine learning system 246 with processing circuitry 202, network communication circuitry 206, storage device 220, input device 204, user interface devices 210, and output device 212.

Application(s) 230 may also include program instructions and/or data that are executable by computing system 120. Example application(s) 230 executable by computing system 120 may include machine learning system 246. Other additional applications not shown may alternatively or additionally be included to provide other functionality described herein and are not depicted for the sake of simplicity.

In accordance with the techniques of the disclosure, computing system 120 uses machine learning system 246 to apply a machine learning model, to a new PCB layout. The machine learning model may be configured using a variety of machine learning architectures. In one example, the machine learning model may be configured as a graphical neural network (GNN).

In some examples, the machine learning model implemented by machine learning system 246 is trained with a training dataset. The training dataset may include a variety of learning data PCB layouts. Training the machine learning model may include operating the machine learning model on a learning dataset. Training may also include evaluating a set of approved ranges against an output. Finally, training may also include adjusting a cost function within the machine learning model.

For example, during a training phase, machine learning system 246 processes a plurality of PCB layout(s). Typically, the plurality of PCB layout(s) are from a plurality of different circuit board designs. Each PCB may have unique transmission lines and component configurations. For example, a training PCB may include a plurality of microstrip transmission lines, each microstrip having a different orientation and routing path. The microstrips may be arranged on the PCB with a plurality of discrete components and connection pads. The orientation of the transmission lines in relation to the components and connection pads may result in patristic impedances. In some examples, a PCB designer may determine which of the PCBs have characteristics in line with desired parasitic impedance values. In some examples, PCB layouts with undesired, but measured or known parasitic values, may be used to train the machine learning model of the machine learning system 246. The machine learning model, within the machine learning system 246 of FIG. 2 may operate to convert the training data into input parameters and weights (e.g. multi-variable vectors, and tensors). Upon creating the input parameters and weights, the machine learning system 246 may apply mathematical operations, such as linear algebraic, nonlinear, or alternative computation operations. Some mathematical operation may be used for the purpose of back propagation. Back propagation includes adjusting the weights based on differences between the estimated parasitic impedance and the known or measured parasitic impedance. Once trained, the machine learning model may be used to estimate parasitic impedances in a new PCB design.

In some examples, the machine learning system 246 first trains the machine learning model. Machine learning system 246 uses PCB layout(s), or circuit boards, as training data to teach the machine learning model by adjusting weights in response to differences between predicted estimates of board parasitic and the measured date. In some examples, different features of the PCB may be represented by different input parameters. Weights associated with board features that have large parasitic impedances may increase during training. Some board features may include, anti-pad clearance, pitch between capacitors, split plane routing identifier, spacing between traces, separation of analog and digital ground planes, virtual split between analog and digital grounds, via locations, differential pair identifiers, and other digitized input descriptors of PCB layout.

In some examples, the training of the machine model using a plurality of circuit layouts further comprises, training the machine learning model with a learning dataset and using a set of approved ranges to update a cost function within the machine learning model. The cost function may be a function used to determine the adjustment of weights. In some examples, machine learning system 246 may use the PCB layout(s) as training data for the machine learning model to apply weights that correspond to one or more subregions of the PCB layout region. Each weight may be a number emphasizing or deemphasizing the impact of various subregions on the overall parasitic estimate of the PCB. By processing numerous printed circuit card layouts, machine learning system 246 may build and train a machine learning model to receive a PCB layout, that machine learning system 246 has not previously analyzed. In processing a new PCB layout, the trained machine learning model may accurately estimate the parasitic impedance of different components and traces on the PCB layout. Typically, the greater the amount of training data, such as PCB layouts, on which the machine learning system 246 is trained, the higher the accuracy of the machine learning model in estimating parasitic impedance values.

In some examples, the approved ranges may be determined in a variety of ways. The approved ranges may include design limits or manufacturing tolerances. In some examples, complex impedance distributions may be acquired from manufacturing a previous of PCB layout. The complex impedance distributions may be used to determine the approved ranges used to update the cost function. In some examples, training involves the updating of the cost function. The machine learning model may be trained once the weights adjusted by the cost function produce outputs within the approved range of values.

After machine learning system 246 has trained the machine learning model, machine learning system 246 may receive new user PCB designs. As with the training data, the PCB designs may be received by machine learning model in the form of digital data. Some examples of digital data may include a variety of 2D or 3D board models with defined electromagnetic material properties. Each PCB design corresponds to a particular circuit design, such as for a high-speed radio frequency (RF) communication boards. Machine learning system 246 applies the trained machine learning model to the new PCB layout for the new circuit design. Further, machine learning system 246 applies the trained machine learning model to identify a portion of the PCB layout selected for redesign. In some examples, identification may be the worst performing region of the board and reconfigure the board layout to remove the worst performing subregion. In some examples, machine learning system 246 may output a determination, with a high level of confidence, that a high level of parasitic impedances on component of subregion, is expected to produce large amounts of electromagnetic loss. In response to determining that the estimated value of the parasitic impedance on a component or subregion is high, the machine learning system may output an estimate of the parasitic impedance value. In one example, outputting an estimate may include displaying a complex impedance value on a GUI 214.

In some examples, the step of outputting an estimate may include, creating an altered layout region, generating the evaluation dataset using the altered layout region, and outputting the altered layout region to a graphical user interface. In some examples, the altered layout region may be a PCB layout that has be changed from an originally input PCB layout. In some examples, generating the evaluation dataset may include selecting similar PCB layouts from a database of PCB layouts, based on characteristics of the altered layout region. Outputting the altered layout region to a graphical user interface, may include displaying a PCB illustration of the trace and component orientations.

In some examples, machine learning system 246 may process one or more PCB layouts into one or more estimated parasitic impedance values. The one or more estimated parasitic impedance values may be outputted via visual display as an image, highlighting subregions of the PCB layout. The image may also include a variety of estimated parasitic impedance values, displayed as numbers or a graph. The estimated parasitic impedance values may correspond with the highlighted subregions of the PCB layout. The estimated parasitic impedance values may also be represented as discrete impedance values. Some parasitic impedance values for an element may include a parasitic resistance for the element, a parasitic inductance for the element, and/or a parasitic capacitance for the element. In such examples, machine learning system may train the machine learning model via a plurality of PCB layout(s) with known or measured parasitic impedance values. Comparing computed estimates to known or measured values, allow the machine learning model to adjust weights based a difference. The adjustment of weights based on a difference between computed estimates and measured values is called back propagation.

In some examples, machine learning system 246, once trained with learning data, may process a new PCB layout, and estimate the parasitic impedance values of subregions of the new PCB layout. In additional examples, machine learning system 246 may determine, for each of the subregions within the PCB layout, which subregion impacts the PCB layout performance in the most significant way. Impact may be proportional to a subregions estimated parasitic impedance. Various subregions have corresponding estimated parasitic impedance values, each parasitic impedance value may contribute to the impedance value of the entire PCB region. Parasitic impedance values of subregions may impact the cumulative parasitic impedance differently. In some examples, parasitic impedance values form some subregions my impact the entire board more significantly because of the electromagnetic field strength along certain portion of the board.

Machine learning system 246 may use weight adjustments of estimated parasitic values of the various subregions to estimate a cumulative parasitic impedance effect. In some examples, subregions with large estimated parasitic impedance values (e.g. worst performing subregions), may be deleted and replaced with a cloned copy of a different subregion within the PCB. After deleting and replacing the subregion, machine learning system 246 may initiate machine learning model to perform a second analysis of the modified PCB. In some examples, iterative analysis may be performed until the estimate of parasitic impedance falls within a predetermined approved range of values.

In some examples, machine learning system 246 may apply the machine learning model to other types of data to determine an estimate of parasitic impedance. For example, machine learning system 246 may apply the machine learning model to circuit schematics, 2D drawings, or databases of material properties. Using any of the data sets, machine learning system 246 may calculate an estimate of parasitic impedance and compare it to a known or measured parasitic impedance value.

In further examples, processing circuitry 202 may generate, from the estimate of parasitic impedance, a 2D rendering of a modified PCB which has an estimate of a parasitic impedance within a range of acceptable values. For example, processing circuitry 202 may apply machine learning system 246 iteratively to get numerous estimates of parasitic impedance values. Each iteration of machine learning system 246 using machine learning model, PCB layout (s) may be modified. PCB layout(s) may be modified by subdividing the entire region into a number of subregions and deleting subregions with large estimated parasitic impedance values. The removed subregions then being replaced with a copy of a subregion from another part of the PCB region. In some examples, each iteration of this estimation process may be directed by processing circuitry 202. Processing circuitry 202 may direct each iteration in series or in parallel to speed up overall processing time. Multiple machine learning models may be utilized through multiple iteration of the machine learning system. Multiple machine learning models running during multiple iteration may be used when processing iterative estimates in parallel.

Additional examples may include training and verification system 242 and evaluation system 244. Training and verification system 242 and evaluation system 244 may be included in applications 230 and stored on storage devices 220. Training and verification system may be implemented with computer instructions used to operate processing circuitry 202. Training and verification system 242 may be used to generate training dataset to be used by machine learning system 246 to train the machine learning model. Evaluation system 244 may also be implemented with computer instructions operated by processing circuitry 202 and configured to transfer evaluation data to machine learning system 246.

In some examples, training and verification system 242 and evaluation system 244 may be combined into a single program operated by processing circuitry 202. Training and verification system 242 may be configured to train the machine learning model with machine learning system 246. Training and verification system 242 may generate, filter, search, or group PCB layout data corresponding to a training dataset and a verification dataset applicable to the type of PCB layout to be evaluated. In conjunction with machine learning system 246, training and verification system 242 may input PCB layout data, selected as training data, into the machine learning model. Using the results generated, the machine learning system 246 may adjust weights of the machine learning model based on a cost function. Adjusting the weights after each model may be done through back propagation. Training and verification system 242 may also be used to verify the trained machine learning model after all data from the training dataset have been input into the machine learning model.

Evaluation system 244 may be configured to transfer the PCB layout(s) selected to be evaluated, to trained machine learning model via machine learning system 246. The verification data may include fewer PCB layouts as compared to the quantity of PCB layouts included in the learning dataset. The verification data may have a greater variety of components or trace orientations. The weights of the machine learning model may be adjusted based on the output response generated after imputing the verification dataset and comparing the result to an expected result.

Figure 3:
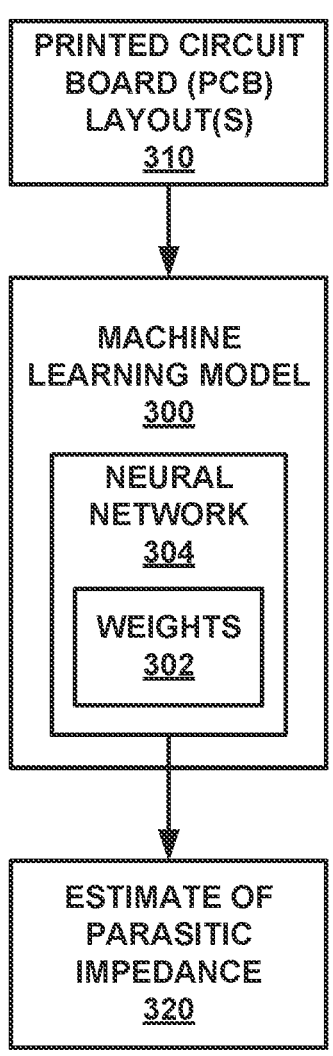
FIG. 3 is a conceptual block diagram illustrating an example of a system for estimating parasitic impedances within PCB layouts, in accordance with one or more techniques of this disclosure.

FIG. 3 is a conceptual block diagram illustrating an example of a method for estimating parasitic impedances 320 within PCB layouts 310, according to one or more techniques of this disclosure. In the example of FIG. 3, the flow of data into and out of machine learning model 300 is illustrated. Machine learning model first takes data representing PCB layouts 310. The data may be imported into input parameters within the machine learning model. Machine learning model 300 may be stored on a storage device. The example of storage device 220 of FIG. 2, may be used as a storage device to store machine learning model 300. In some examples, machine learning model may be implemented with a machine learning system such as machine learning system 246 of FIG. 2. Machine learning model 300 may implement a variety of machine learning architectures in order to process the PCB layout(s). In the example of FIG. 3, a neural network 304 is implemented. Neural network 304 may utilize weights 302 to emphasize or deemphasize the impact for which various input parameters have on the outcome of machine learning model 300. Machine learning model 300 may be trained to accurately analyze PCB layout(s) 310, and output a reliable and accurate estimate of parasitic impedance 320. Training machine learning model 300 may include adjusting weights 302 using the results generated from imputing various PCB layout(s) 310. The process of adjusting weights 302 may include processing estimates of parasitic impedance 320 and comparing the result to a known or measured value corresponding to the PCB layout(s) 310 used as an input. The comparison and adjusted of weights 302 may be referred to as back propagation.

In the example of FIG. 3, PCB layout(s) 310 may be input into machine learning model 300 as digital data. PCB layout(s) 310 may be represented as data in a variety of forms. In some examples, the data may be data representing a three-dimensional (3D) computer aided design (CAD) file. Such a file may represent PCB layout(s) 310 as 3D shapes with assigned dimensions and material properties. In some examples, PCB layout(s) 310 may be represented as data corresponding to a mesh of electromagnetic property values. In some examples digital data may represent input parameters about features on PCB layout(s) 310. Some examples of input parameters may include, anti-pad clearance, pitch between capacitors, split plane routing identifier, spacing between traces, separation of analog and digital ground planes, virtual split between analog and digital grounds, via locations, differential pair identifiers, and other digitized input descriptors of PCB layout. In some examples, PCB layout(s) 310 may be represented as data specifying a web of lumped element values (e.g. resistance, inductance, and capacitance). Each lumped value being spatially associated with other lumped values, wherein each lumped value represents a characteristic impedance.

In the example of FIG. 3, PCB layout(s) 310 may include integrated chips comprise active and passive components. In some examples the PCB layouts may include a plurality of integrated chips, a plurality of lumped elements, and a plurality of transmission lines. The lumped elements may also include active and passive components. The lumped elements, integrated chips, and traces may be represented as digital data representing physical features as well as the electromagnetic properties of the PCB layout(s) 310.

In the example of FIG. 3, the data representing the PCB layout(s) may be stored in the storage device. One example of the storage device may include storage device(s) 220 of FIG. 2. The data may then be processed by machine learning model 300 using a machine learning system. One example of the machine learning system my include machine learning system 246 of FIG. 2. In some examples, PCB layouts may be converted into data and sent to a simulation server. One example of the simulation server may be simulation server 130 of FIG. 1. The simulation server may import the data into a machine learning model 300, thereby producing estimate of parasitic impedance 320.

The data representing PCB layout(s) 310, may be used for a variety of purposes within machine learning model 300. In some examples the data may be used as training data, verification data, or evaluation data (e.g. application data). Training data is used to train the machine learning model 300 on data for which a known or measured result exists. Training data may include data representing a large sample of PCB layout(s) with known or measured parasitic impedance values. The known or measured parasitic impedance values for the training data may have a normal distribution of values. Verification data may include datasets representing a small sampling of PCB layout(s) 310 with known or measured parasitic impedance values. The known or measured parasitic impedance values for the verification data may have a greater distribution than the training data. The evaluation data (e.g. application data) may include data representing a single PCB layout having no known or measured impedance values.

In some examples, the data representing PCB layout(s) 310 (e.g. training data, verification data, and application data) may be processed into an estimate of parasitic impedance 320 by machine learning model 300. In the example of FIG. 3, machine learning model 300 uses neural network 304 to process the data. While processing the data, neural network 304, within machine learning model 300, may use weights 302 to emphasize, or deemphasize, the influence particular subregions have on the estimate of parasitic impedance 320.

In the example of FIG. 3, neural network 304 is used by machine learning model 300 to adjust weights within the model. Neural network 304 may use weights to deemphasize or attenuate the influence particular subregions of the PCB layout has on the estimate of parasitic impedance 320. Before the first training data is imported into the model, the value of weights 302 may be randomly assigned. In some examples, the value of weights 302 may be assigned proportionate to the initial input data values. After the first training data, has been processed into an estimate of parasitic impedance 320, weights may be adjusted using back propagation.

In some examples, back propagation may include mathematical operations based on a difference between the resulting estimate of parasitic impedance 320 and the corresponding known or measured parasitic impedance value. A greater difference between the estimate and the known or measured value may result in a larger change to weights 302. After training data has been processed into an estimation of parasitic impedance 320 by neural network 304, back propagation is performed. In some examples, verification data may be processed after the learning data.

The verification data may be used to verify that weights 302 have been property trained with a large enough learning dataset. In some examples, verification data may represent PCB layout(s) 310 with known or measured values having a greater statistical distribution (e.g. variance) than the previous learning data. A larger statistical distribution allows the machine learning system to test the trained neural network 304 on data less likely observed as application data. If the machine learning model is capable of processing highly variable verification data, the machine learning model will likely be more successful at estimating parasitic impedance values for application data.

In the example of FIG. 3, machine learning model 300 includes an architecture of input parameters, relational connections (e.g. vectors, or tensors), and weights 302 (e.g. magnitudes). In the example of FIG. 3, neural network 304 may include input parameters. Input parameters data input values that are relationally connected to other input parameters. Relational connects are mappings of input parameters (e.g. nodes) illustrating data transfer between input parameters. In some examples each node has a relational connection with one or more nodes. In some examples, the relational connection may include amplification or attenuation of the input values from the related nodes before or after performing a mathematical operation. In some examples, such as GNNs, an input parameter may be manipulated via a variety relational connections and nodes to modify later inputted values. The initial input parameter values are derived from the data used to represent the PCB layout(s) 310. Deriving the input values from PCB layout(s) 310 may include, dividing a matrix up into individual values which may be used as input values into the input parameters.

In the example of FIG. 3, neural network 304 may include a variety of architectures. Some examples of different architecture used for neural network 304 include, convolution neural networks, artificial neural network, deep learning neural networks, and subsampling neural networks. In the example of FIG. 3. Neural network 304 may include a combination of the different neural network architectures along with a variety of neural networks not explicitly mentioned in the disclosure. In the example of FIG. 3, GNNs may be used. GNN is a well-known architecture for modeling relations. GNNs are neural models that capture the dependence of graphs via message passing between the nodes of graphs. An estimation (e.g. predication model) may be evaluated on a large dataset of digital circuits, digital PCBs, or other data representing circuit models.

In some examples, a GNN is formed from a web of interconnecting relations (e.g. vectors) between a plurality of graph nodes. Each node additionally represents an input parameter for data input. In the example of a GNN, a time element may be introduced to represent layers of the neural network. Each layer may be defined as the state of all nodes within the neural network, at a moment in time. Moving from one layer to the next includes updating each node in the neural network one time based on the inputs from the interconnected nodes. After a plurality of layers have been exercised, the state of the nodes may be accumulated and processed into an estimate of parasitic impedance 306.

In the example of FIG. 3, weights 302 may be implemented in a variety of ways. In the example of FIG. 3, weights 302 include numeric values between one and zero corresponding to the influence a particular node has on the value of another node. In one example, a first relational connection between a first node and a second node may be amplified or attenuated with a first weight from weights 302. A third node may have a second relational connection with the second node using a second weight from weights 302. The relational connection of the first and second relational connections with the largest weight will influence the third node most significantly. However, during the learning process, the weights of the neural network may be adjusted based on back propagation. Back propagation may be used to adjust the weights based on the difference between the calculated estimate of parasitic impedance and the measured or known parasitic impedance for a PCB layout in a plurality of PCB layouts used as training data. When the difference between the estimate of parasitic impedance is large as compared to the known or measured parasitic impedance value, weights 302 may be adjusted with larger adjustments.

Figure 4:
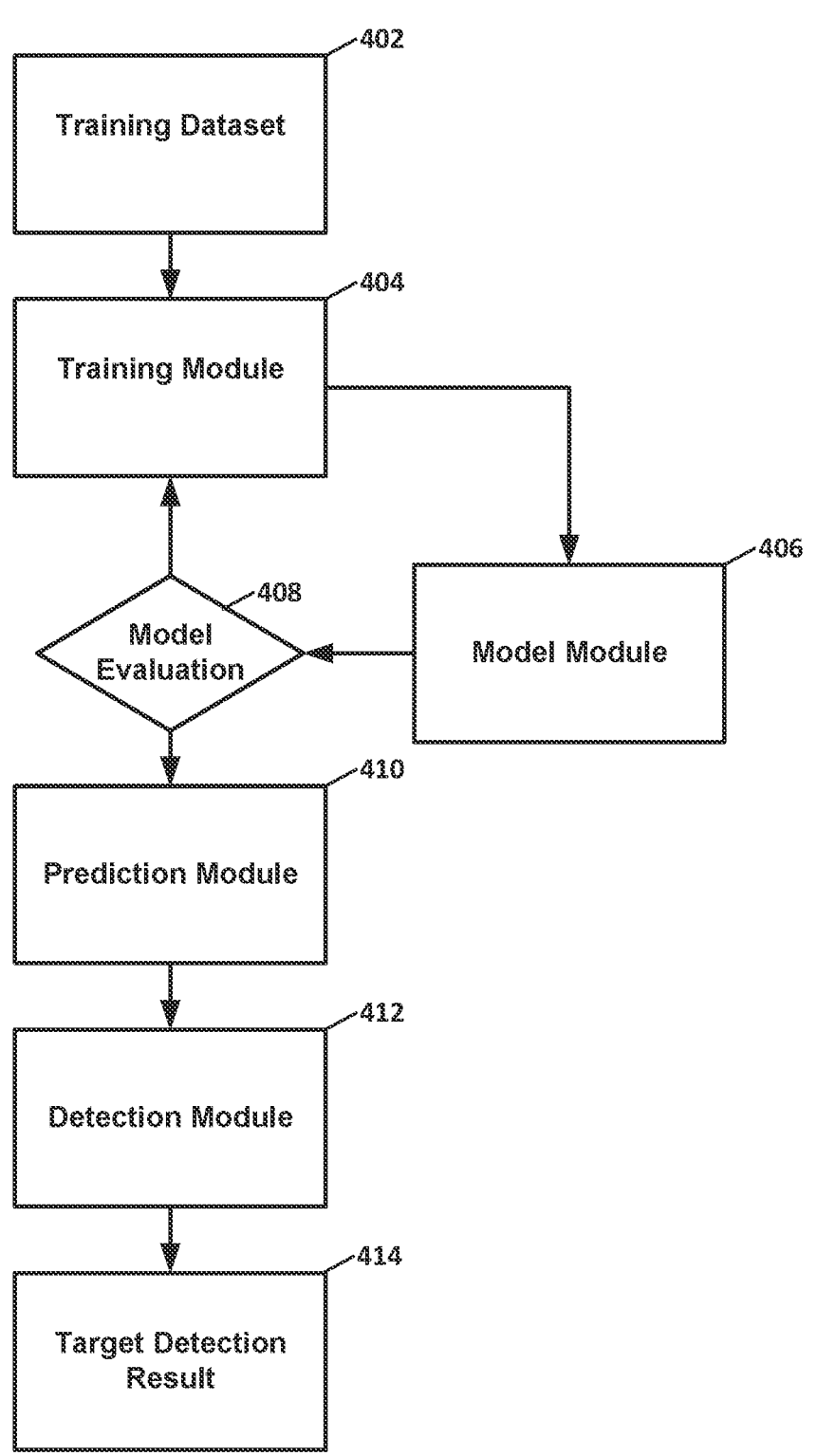
FIG. 4 is a flow diagram illustrating an example of a process implemented by machine learning model producing an estimate of parasitic effects, in accordance with one or more techniques of this disclosure.

FIG. 4 is a flow diagram illustrating an example of a process implemented by machine learning model producing an estimate of parasitic impedance. In the example of FIG. 4, training dataset 402 is sent to the training module 404. Training module 404 may train machine learning model using model module 406 while retaining the network. In one example, training module 404 may integrated into training and verification system 242 of FIG. 2. Model module 406 may provide feedback to training module 404 based on training model using module. In one example, model module 406 may be integrated into machine learning system 246 of FIG. 2. In some examples, model module 406 may provide feedback requesting training module 404 use particular subsets of training dataset 402 to train machine learning model via model module 406. The machine learning model trained using training module 404 and model module 406 is evaluated using model evaluation 408. In one example, model evaluation 408 may be integrated into training and verification system 242 of FIG. 2. If the model evaluation determines the model is not adequately trained or verify, training module 404 will continue to train the model operated by model module 406. If the model evaluation 408 determines that the model is trained and verified, the model is sent via model module 406 to a prediction module 410. Prediction module uses data or evaluation data in model module to predict a parasitic model. The parasitic model may be sent to detection module 412 where values for parasitic impedances are predicted by prediction module 410. By comparison, subregions of the PCB layouts with the highest predicted parasitic impedance values may be determined. Based on the determination of which sub-regions have the highest parasitic impedance values, a target detection result 414 may be generated. The target detection result 414 may be a digital data representing a PCB layout, a parasitic impedance value, or other data source that indicates a prediction of the parasitic effects. Additional resulting information from target detection result 414 may include and identification of the part of the board with the highest parasitic impedance or the suggested changes to meet a parasitic impedance requirement.

In some examples, the model in the model module is a GNN that is created by model module 406. The machine learning model may be trained via training module 404 using training dataset 402. The machine learning model may be evaluated using model evaluation 408 to determine whether the trained machine learning model has been verified. In some examples, if the trained machine learning model has not been verified, a different training dataset 402 may be requested. Additionally, an unverified machine learning model may result in the machine learning model being altered. In some examples, model module 406 will create a new or altered GNN, training the new or altered GNN with the training dataset 402. The new or altered GNN, may be reevaluated using model evaluation 408. If the model is determined to be verified by model evaluation 408, the model may be sent to prediction module 410, where the results would be further sent to detection module 412. A detection result coming from detection module 412 may be sent to target detection result 414.

FIG. 5 is a flow diagram illustrating an example of a process implemented by machine learning model 300 resulting in an estimate of parasitic impedance 306. In the example of FIG. 5, the process of producing an estimate of a parasitic impedance may be implemented by machine learning system 246. The process may include initializing and evaluating a current result 502, and using the current result to generate learning samples and validation samples for a region 504. In the example of FIG. 5, the process includes creating an intermediate neural model 506. In some examples, the machine learning model may be created by machine learning system 246 of FIG. 2. After creating an intermediate neural model 506, the process includes training the intermediate neural model with learning samples 508 and evaluating current result using validation samples 510. Once evaluating current result using validation samples 510 is completed, comparing current result to desired range 512 may be performed. If the result is in the desired range the model has been validated and the process may output result 520.

However, if the result is not within the desired range the process may continue by splitting region into equal subregions 514. Splitting region into equal subregions 514, may include dividing the PCB layout area into smaller PCB layout areas, all smaller PCB layout areas tessellating the larger region. Splitting the region into equal subregions may include identifying a portion of the PCB layout selected for redesigned. One example includes identifying and removing the worst performing subregion 516 and replacing the worst performing subregion with a different subregion 518.

After splitting region into equal subregions 514, identifying and removing worst performing subregion 516 may be performed in a variety of ways. The smaller PCB layout areas, or subregions may be evaluated for an estimate of its respective parasitic effects. Through comparison, the worst estimated parasitic effect resulting from a corresponding subregion, may be determined. In one example the estimated parasitic effect may be compared to a desired acceptable range. Subregions with estimated parasitic effects outside the acceptable range may be determined to be the worst performing subregion.

In some examples, the new region with the replaced subregion may be evaluated again for a current result, regenerating learning samples and validation samples, recreating an intermediate neural model, retraining intermediate neural model with learning samples reevaluating a current result and again comparing the current result to desired range. The process would start again by evaluating a current result using the new region as evaluation data (e.g. application data). The process may continue until comparing current result to desired range 512 yields a current result within the desired range. Upon a current result being with the desired range, output result 520 may occur.

Figure 6:
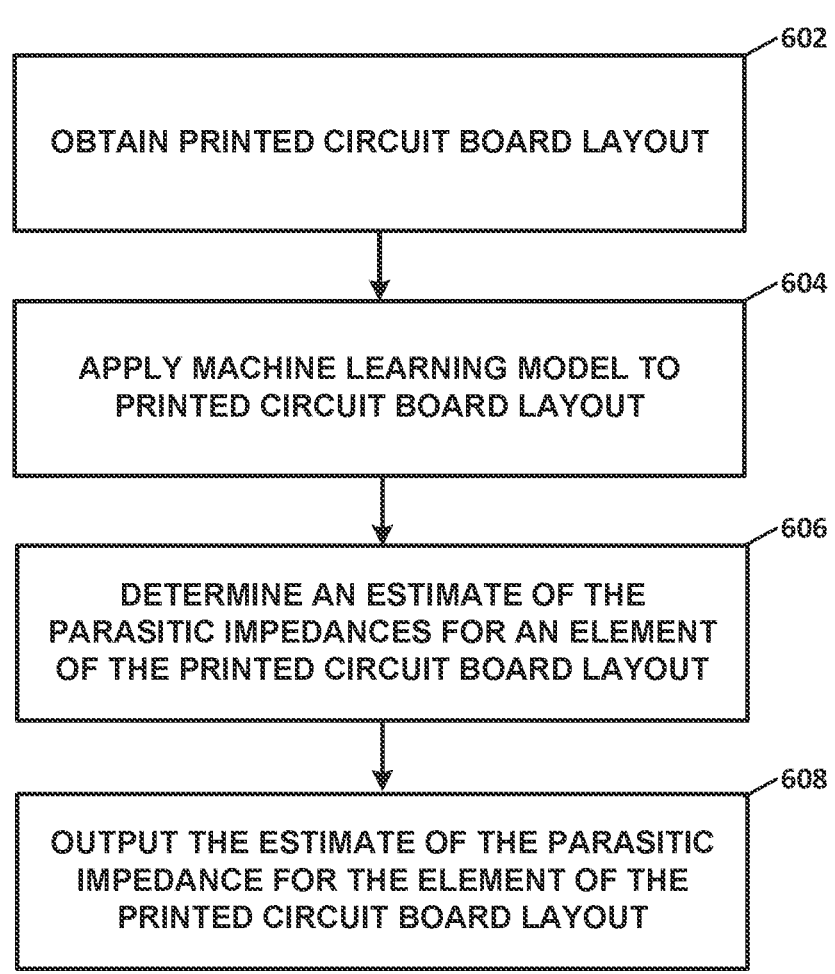
FIG. 6 is a flow diagram illustrating an example of a process implemented by a machine learning model to produce an estimate of a parasitic impedance.

FIG. 6 is a flow diagram illustrating an example of a process implemented by a machine learning model to produce an estimate of a parasitic impedance. The process of FIG. 6 may be implemented using network 100 of FIG. 1. The process may include a step to obtain PCB layout 602 from a user or digital interface. In some examples, the user may scan a copy of the layout via a scanner of digital camera. In some cases, the layout may be created from digital software and may be obtained from a digital storage medium where the layout is stored.

In some examples, computing system 120 or simulation server 130 of FIG. 1 may apply machine learning model to PCB layout 604. Machine learning model may be a learning model that has been created, trained, and verified via the machine learning process of FIG. 4 or FIG. 5. The machine learning process may use a machine learning process made via a GNN or other neural network.

In some examples computing system 120 or simulation server 130 of FIG. 1 may determine an estimate of the parasitic impedances for an element of the PCB layout 606. Determining the estimate, may include applying the machine learning model to evaluation data and producing an output. In some examples, the step of determining an estimate may include inputting evaluation data into a neural network with adjusted weights based on training and evaluation data. The element of the PCB may be a trace, via hole, landing pad, board parameter, or other board characteristic.

In additional examples, computing system 120 of FIG. 1 may output the estimate of the parasitic impedance for the element of the PCB layout 608. In some examples, the estimate may be a graphical display of the evaluated PCB. In some examples, the graphical display may illustrate the location of a parasitic impedance and an equivalent discrete component representation. In some examples, the estimate of the parasitic impedance may be an illustration of an equivalent discrete circuit. In some examples, outputting the estimate comprises, creating an altered layout region, regenerating the evaluation dataset using the altered layout region, and outputting the altered layout region to a GUI.

The following examples may illustrate one or more aspects of the disclosure.

Clause 1: A method comprising: obtaining a printed circuit board (PCB) layout; applying a machine learning model to the PCB layout to determine an estimate of a parasitic value for an element in the PCB layout, wherein the machine learning model is a trained machine learning model configured to operate on a plurality of PCB layouts; and outputting the estimate of the parasitic value for the element in the PCB layout.

Clause 2: The method of clause 1, wherein the parasitic value for the element comprises one of a parasitic resistance for the element, a parasitic inductance for the element, or a parasitic capacitance for the element.

Clause 3: The method of clause 1-2, wherein the machine learning model comprises a graphical neural network.

Clause 4: The method of clause 1-3, wherein outputting the estimate comprises: generating an evaluation dataset; creating an altered layout region based on the evaluation dataset; and outputting the altered layout region to a graphical user interface.

Clause 5: The method of clause 1-4, wherein outputting the estimate comprises displaying a complex impedance value on a graphical user interface.

Clause 6: The method of clause 1-5, wherein the trained machine learning model is trained using a plurality of PCB layouts, the training further comprising: operating the machine learning model on a learning dataset; evaluating a set of approved ranges against an output; and adjusting a cost function within the machine learning model.

Clause 7: The method of clause 6, wherein in the set of approved ranges comprises complex impedance distributions acquired from manufacturing a previous of PCB layout.

Clause 8: The method of clause 1-7, wherein configured to operate further comprises: identifying a portion of the PCB layout selected for redesign.

Clause 9: The method of clause 1-8, wherein the PCB layout comprises a plurality of integrated chips, a plurality of lumped elements, and a plurality of transmission lines.

Clause 10: The method of clause 1-9, wherein the integrated chips comprise active and passive components and the lumped elements comprise active and passive components.

Clause 11: A system comprising: a memory; and processing circuitry coupled to the memory and configured to: obtain a PCB layout; applying a machine learning model to the PCB layout to determine an estimate of a parasitic value for an element in the PCB layout, wherein the machine learning model is a trained machine learning model configured to operate on a plurality of PCB layouts; and a display configured to output the estimate of the parasitic value for the element in the PCB layout.

Clause 12: The method of clause 11, wherein the parasitic value for the element comprises one of a parasitic resistance for the element, a parasitic inductance for the element, or a parasitic capacitance for the element.

Clause 13: The method of clause 11-12, wherein the machine learning model comprises a graphical neural network.

Clause 14: The method of clause 11-13, wherein outputting the estimate comprises, generating an evaluation dataset; creating an altered layout region based on the evaluation dataset; and outputting the altered layout region to a graphical user interface.

Clause 15: The method of clause 11-14, wherein in the set of approved ranges comprises complex impedance distributions acquired from manufacturing a previous of PCB layout.

Clause 16: The method of clause 11-15, wherein the training of the machine model using a plurality of circuit layouts further comprises, training the machine learning model with a learning dataset and using a set of approved ranges to update a cost function within the machine learning model.

Clause 17: The method of clause 11-16, wherein configured to operate further comprises: identifying a portion of the PCB layout selected for redesign.

Clause 18: The method of clause 11-17, wherein the PCB layout comprises a plurality of integrated chips, a plurality of lumped elements, and a plurality of transmission lines.

17

18

Clause 19: The method of clause 16-18, wherein the integrated chips comprise active and passive components and the lumped elements comprise active and passive components.

Clause 20: The method of clause 11-19, wherein the PCB layout comprises a plurality of integrated chips, a plurality of lumped elements, and a plurality of transmission lines.

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile random access memory, electrically erasable programmable read-only memory (EEPROM), or flash memory. The computer-readable storage media may be configured to store non-transitory signals.

The techniques described in this disclosure may be implemented, at least in part, in hardware, software, firmware or any combination thereof. For example, various aspects of the techniques may be implemented within one or more processors, including one or more microprocessors, digital signal processors, application-specific integrated circuit, field-programmable gate arrays, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an application-specific integrated circuit, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, where the operations described herein may be distributed across the processors and devices.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

What is claimed is:

1. A method comprising:
    obtaining a printed circuit board (PCB) layout;
    applying a machine learning model to the PCB layout to determine an estimate of a parasitic value for an element in the PCB layout, wherein the machine learning model is a trained machine learning model configured to operate on a plurality of PCB layouts; and outputting the estimate of the parasitic value for the element in the PCB layout, including displaying a complex impedance value on a graphical user interface.

2. The method of claim 1, wherein the parasitic value for the element comprises one of a parasitic resistance for the element, a parasitic inductance for the element, or a parasitic capacitance for the element.

3. The method of claim 1, wherein the machine learning model comprises a graphical neural network.

4. The method of claim 1, wherein outputting the estimate comprises:
    generating an evaluation dataset;
    creating an altered layout region based on the evaluation dataset; and
    outputting the altered layout region to a graphical user interface.

5. The method of claim 1, wherein the trained machine learning model is trained using a plurality of PCB layouts, the training further comprising:
    operating the machine learning model on a learning dataset;
    evaluating a set of approved ranges against an output; and
    adjusting a cost function within the machine learning model.

6. The method of claim 5, wherein in the set of approved ranges comprises complex impedance distributions acquired from manufacturing a previous of PCB layout.

7. The method of claim 1, wherein applying the machine learning model to the PCB layout further comprises:
    identifying a portion of the PCB layout selected for redesign.

8. The method of claim 1, wherein the PCB layout comprises a plurality of integrated chips, a plurality of lumped elements, and a plurality of transmission lines.

9. The method of claim 8, wherein the integrated chips comprise active and passive components and the lumped elements comprise active and passive components.

10. A system comprising:
    a memory; and
    processing circuitry coupled to the memory and configured to:
        obtain a PCB layout;
        apply a machine learning model to the PCB layout to determine an estimate of a parasitic value for an element in the PCB layout, wherein the machine learning model is a trained machine learning model configured to operate on a plurality of PCB layouts; and
    a display configured to output the estimate of the parasitic value for the element in the PCB layout, including displaying a complex impedance value on a graphical user interface.

11. The system of claim 10, wherein the parasitic value for the element comprises one of a parasitic resistance for the element, a parasitic inductance for the element, or a parasitic capacitance for the element.

12. The system of claim 10, wherein the machine learning model comprises a graphical neural network.

13. The system of claim 10, wherein to output the estimate, the processing circuitry is further configured to:
    generate an evaluation dataset;
    create an altered layout region based on the evaluation dataset; and
    output the altered layout region to a graphical user interface.

14. The system of claim 10, wherein the machine model is trained using a plurality of circuit layouts, the training further comprising:

training the machine learning model with a learning dataset and using a set of approved ranges to update a cost function within the machine learning model.

15. The system of claim 14, wherein in the set of approved ranges comprises complex impedance distributions acquired from manufacturing a previous of PCB layout.

16. The system of claim 10, wherein to apply the machine learning model to the PCB layout, the processing circuitry is further configured to:

identify a portion of the PCB layout selected for redesign.

17. The system of claim 10, wherein the PCB layout comprises a plurality of integrated chips, a plurality of lumped elements, and a plurality of transmission lines.

18. The system of claim 17, wherein the integrated chips comprise active and passive components and the lumped elements comprise active and passive components.

19. A method comprising:
obtaining a printed circuit board (PCB) layout;
applying a machine learning model to the PCB layout to determine an estimate of a parasitic value for an element in the PCB layout, wherein the machine learning model is a trained machine learning model configured to operate on a plurality of PCB layouts; and
outputting the estimate of the parasitic value for the element in the PCB layout, including:
generating an evaluation dataset,
creating an altered layout region based on the evaluation dataset, and
outputting the altered layout region to a graphical user interface.

* * * * *